United States Patent
Wong et al.

(10) Patent No.: US 9,608,532 B2
(45) Date of Patent: Mar. 28, 2017

(54) BODY DIODE CONDUCTION OPTIMIZATION IN MOSFET SYNCHRONOUS RECTIFIER

(71) Applicants: Pitleong Wong, San Jose, CA (US); Yuancheng Ren, Hangzhou (CN); Xunwei Zhou, Milpitas, CA (US)

(72) Inventors: Pitleong Wong, San Jose, CA (US); Yuancheng Ren, Hangzhou (CN); Xunwei Zhou, Milpitas, CA (US)

(73) Assignee: JoulWatt Technology Inc. Limited, Hangzhou (CN)

( * ) Notice: Subject to any disclaimer, the term of this patent is extended or adjusted under 35 U.S.C. 154(b) by 19 days.

(21) Appl. No.: 14/678,932

(22) Filed: Apr. 4, 2015

(65) Prior Publication Data

US 2016/0294298 A1    Oct. 6, 2016

(51) Int. Cl.
*H02M 3/335* (2006.01)
*H02M 1/38* (2007.01)
*H02M 1/00* (2006.01)
*H02M 3/158* (2006.01)

(52) U.S. Cl.
CPC ......... *H02M 3/33592* (2013.01); *H02M 1/38* (2013.01); *H02M 3/1588* (2013.01); *H02M 2001/0009* (2013.01); *H02M 2001/0058* (2013.01); *Y02B 70/126* (2013.01); *Y02B 70/1475* (2013.01)

(58) Field of Classification Search
CPC .... H02M 7/527; H02M 7/516; H02M 7/5383; H02M 3/338; H02M 3/33592; H02M 1/42
See application file for complete search history.

(56) References Cited

U.S. PATENT DOCUMENTS

| | | | |
|---|---|---|---|
| 6,373,727 B1 | 4/2002 | Hedenskog et al. | |
| 7,262,980 B2 | 8/2007 | Phadke et al. | |
| 7,688,602 B2 | 3/2010 | Hu | |
| 7,940,536 B2 | 5/2011 | Salato | |
| 8,436,594 B2 | 5/2013 | Fu et al. | |
| 8,803,494 B2 | 8/2014 | D'Angelo et al. | |
| 2007/0091650 A1* | 4/2007 | Chen ................. | H02M 3/33592 363/17 |
| 2009/0027020 A1* | 1/2009 | Qiu ..................... | H02M 3/1588 323/282 |
| 2009/0231895 A1* | 9/2009 | Hu ..................... | H02M 3/33592 363/127 |
| 2010/0124086 A1* | 5/2010 | Chen ................. | H02M 3/33592 363/127 |

(Continued)

*Primary Examiner* — Jessica Han
*Assistant Examiner* — Bart Iliya

(57) ABSTRACT

To maximize power efficiency, dead time between "on" times of a synchronous rectifier ("SR") MOSFET switch and a main switch for CCM operation in particular in isolated and non-isolated self-driven synchronous DC-DC converters needs to be optimized. To accomplish that objective, the latest conduction time t of a body diode of the SR MOSFET following conduction thereof is determined, compared with a selected fixed optimum period T1, and incrementally or decrementally adjusted in a subsequent switching cycle while t is unequal to T1, depending on whether t is shorter or longer than T1, so that t eventually is made substantially equal to T1 in length. This process is to be repeated continuously.

23 Claims, 11 Drawing Sheets

(56) References Cited

U.S. PATENT DOCUMENTS

2010/0327765 A1* 12/2010 Melanson ........... H02M 3/3374
 315/291
2011/0096578 A1* 4/2011 Fang ................. H02M 3/33592
 363/127
2015/0049529 A1* 2/2015 Iorio ................. H02M 3/33507
 363/89

* cited by examiner

BODY DIODE CONDUCTION OPTIMIZATION IN MOSFET SYNCHRONOUS RECTIFIER

BACKGROUND

Field

The subject matter disclosed herein relates to a switching power supply converter and more particularly relates to efficient operation of a DC-DC converter using a synchronous rectifier ("SR") MOSFET.

Description of the Related Art

Although conventional self-synchronized flyback DC-DC converters with synchronous rectification operate quite well in a discontinuous conduction mode ("DCM"), they experience an inefficient SR turn off in a continuous conduction mode ("CCM"). Up to now solutions to that problem are somewhat costly. For example, FIG. 1a is a block diagram of a conventional self-synchronized flyback DC-DC converter with synchronous rectification, using a delay generator 107 on the primary side to avoid adverse effects of fast transients resulting from a hard switching to "on" of the primary power switch MOS 1. The fast transients do not allow the SR switch MOS 2 on the secondary side to turn off quickly enough. This results in rather significant and undesirable reverse currents flowing through MOS 2.

The delay generator 107 is provided to delay the turn-on of MOS 1, so that MOS 2 may be completely turned off when the MOS 1 is turned on. The delay generator 107 includes a delay device 105 and a third switch MOS 3 connected in series with a capacitor Cn, which are connected in parallel with MOS 1. As shown in FIG. 1b, the delay device 105 includes an RC cell connected on an upper buffer driver of a bipolar complementary stage circuit. This RC cell is embodied by the resistor Rd and the capacitor Cd. The values of Rd and Cd may be selected or adjusted to establish the appropriate or desired delay time. Alternatively, a digital counter or some other appropriate component may be used instead. Nevertheless, this delay generator 107 utilizing a number of discrete components on the primary side is not cost effective.

BRIEF SUMMARY

The apparatus to enable an efficient turn off operation of an SR MOSFET switch in CCM by optimizing its body diode conduction time associated with a self-synchronized DC-DC converter with synchronous rectification is provided with a logic unit containing a plurality of modules configured to functionally execute the necessary steps of such operation. These modules in the disclosed embodiments basically include two input voltage terminals, an output module including two output voltage terminals and an output-filter capacitor to be connected across the output voltage terminals, a main switch to be disposed between the input voltage terminals, and an SR MOSFET switch having a gate control terminal and a distal end to be connectable to the output module, and a switch connector to connect the main switch with the SR MOSFET.

In an isolated DC-DC converter, the switch connector may be a transformer having a primary winding and a secondary winding, with the main switch being on the primary side and the SR MOSFET switch, on the secondary side. In a non-isolated DC-DC converter, the switch connector may be a pair of electrical leads.

In addition, these modules include an SR turn-off signal generator used to provide an SR turn-off signal to terminate conduction of the SR MOSFET at an appropriate time to make a subsequent conduction time of its body diode substantially equal to a selected fixed optimum period T1 over a number of switching cycles. The SR turn-off signal generator includes a) a body diode conduction detector that detects the latest body diode conduction time t following an end of the SR MOSFET conduction, and b) a body diode conduction optimizer that compares the time duration t with the time duration T1 and outputs the SR turn-off signal incrementally sooner or later than the end point of the latest SR MOSFET conduction while t is unequal to T1, depending on whether t is shorter or longer than T1.

These modules further include a self-synchronized control circuit having an output to be connected to the gate control terminal of the SR MOSFET to turn it on and off. Said control circuit responsive to receiving the SR turn-off signal transmitted by the body diode conduction optimizer turns the SR MOSFET off. A method and system also perform the functions of the apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 1b is an exemplary illustration of one embodiment of a delay device used in the delay generator of FIG. 1a;

DETAILED DESCRIPTION OF THE INVENTION

Figure 1A:
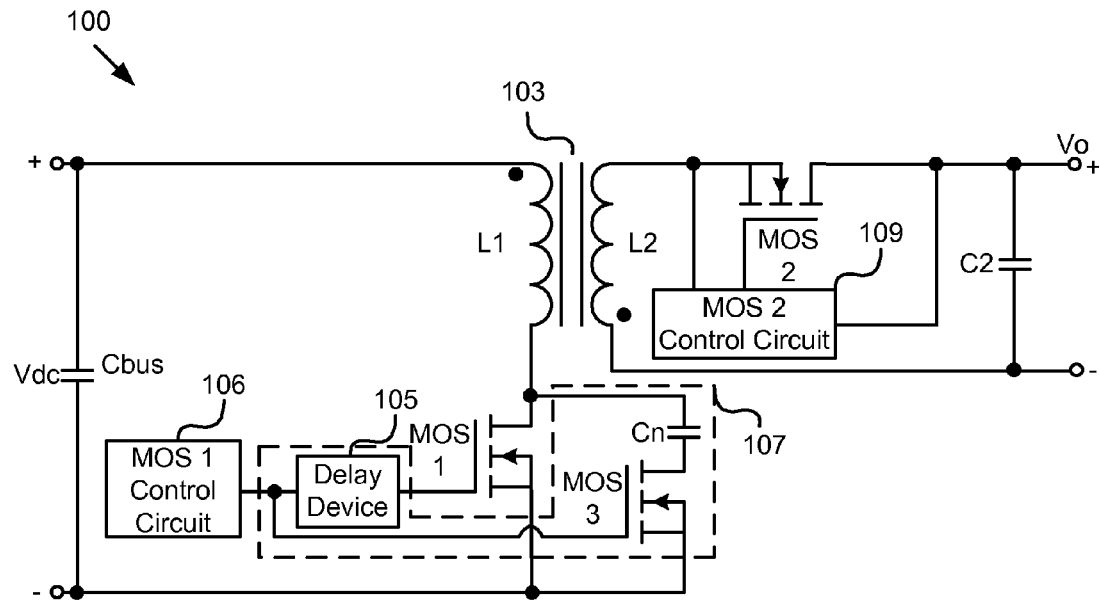
FIG. 1a is a schematic block diagram illustrating one embodiment of a conventional self-synchronized flyback synchronous rectification DC-DC converter using a delay generator to ensure an efficient SR turn off operation in CCM mode.
Figure 1B:
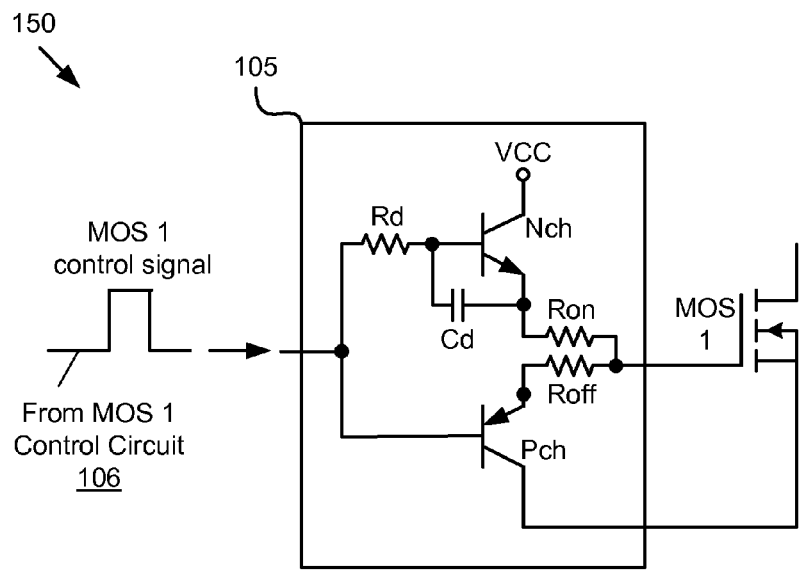

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

The term "circuit" means at least either a single component or a multiplicity of components, either active and/or passive, that are coupled together to provide a desired function or functions. The term "signal" means at least one current, voltage, charge, temperature, data, or other signal. A signal may be used to communicate using active high, active low, time multiplexed, synchronous, asynchronous, differential, single-ended, or any other digital or analog signaling or modulation techniques. References in the singular are made merely for clarity of reading and include plural references unless plural references are specifically excluded.

The schematic flowchart diagrams and/or schematic block diagrams in the Figures (also referred to as FIGs) illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of preceding figures. Like numbers refer to like elements in all figures, including alternate embodiments of like elements.

Figure 2:
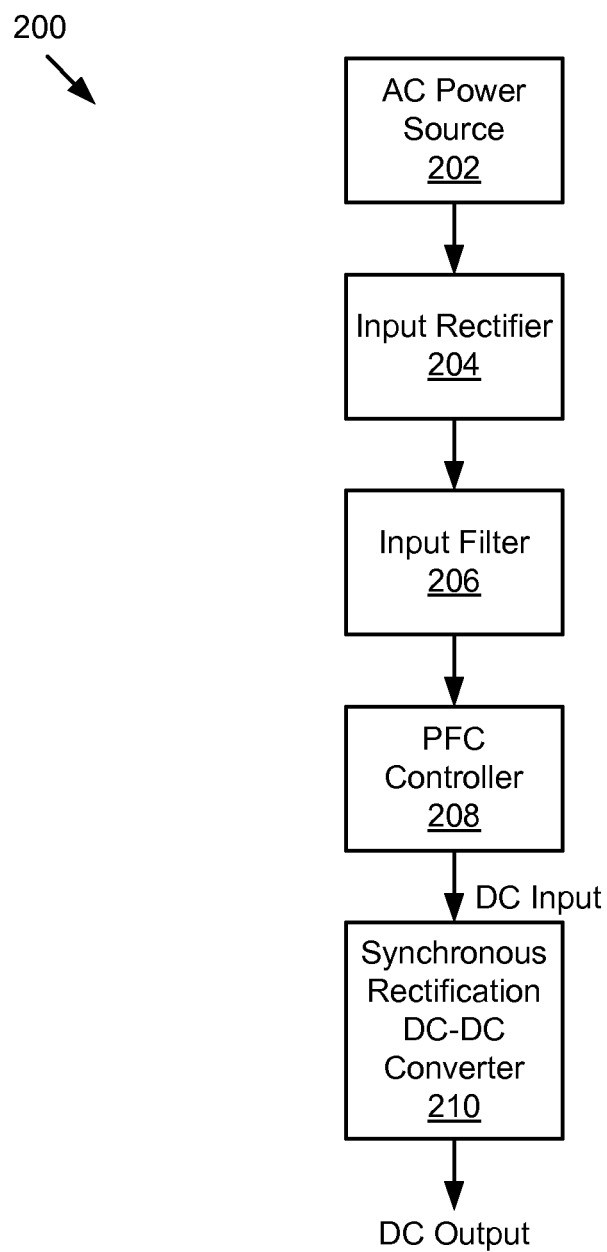
FIG. 2 is a schematic block diagram illustrating one embodiment of a switching power supply system according to the present invention.

FIG. 2 is a schematic block diagram illustrating one embodiment of a switching power supply system 200 according to the present invention. A switching power supply is an electronic power supply that includes a switching regulator to convert electrical power efficiently. The switching power supply system 200 includes an alternating current ("AC") power source 202, an input rectifier 204, an input filter 206, a power factor correction ("PFC") controller 208, and a synchronous rectification DC-DC converter 210, where DC stands for direct current.

Figure 3:
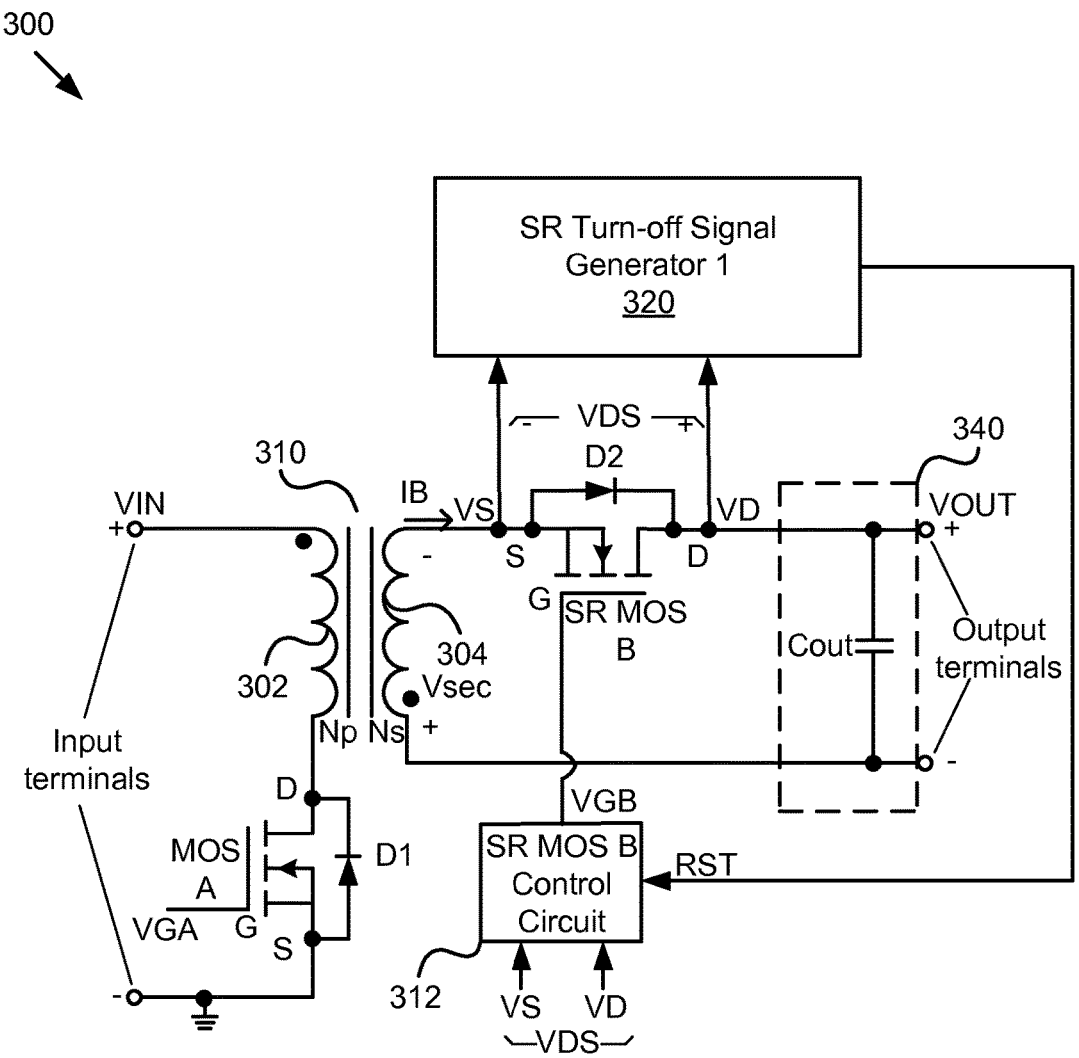
FIG. 3 is a schematic block diagram illustrating one embodiment of an exemplary self-synchronized isolated synchronous rectification DC-DC converter with one embodiment of an SR turn-off signal generator according to the present invention.

The AC power source 202 is a part of an AC-DC converter, which typically runs off the mains input. The input rectifier 204 may include a full-wave bridge rectifier that rectifies the incoming sinusoidal AC voltage to a DC voltage level with ripples. The input filter 206 usually includes a smoothing capacitor used to convert the rippled output from the input rectifier 204 into a smooth DC output voltage. The PFC controller 208 makes the output current from the input filter 206 follow the sinusoidal shape of the AC input voltage, producing a DC output with a maximum power factor. The power factor is defined as the ratio of the end real power flowing to the load to the apparent power in the circuit, and is a dimensionless number in the closed interval of −1 to 1. Real power is the capacity of the circuit for performing work in a particular time. Apparent power is the product of the current and voltage of the circuit. Note that an AC-DC converter may be included in a certain embodiment of the PFC controller 208, which is configured as a boost or flyback converter (such as shown in FIG. 3), in which case the present invention also applies to an AC-DC converter.

The synchronous rectification DC-DC converter 210 is a type of DC-DC converter using a synchronous rectification technique to convert one level of an input DC voltage to another DC voltage level at the output, with higher power efficiency than some other types. In general, DC-DC voltage converters are often used to provide a regulated voltage supply from an unregulated voltage source. Regulated voltage supplies provide an average DC output voltage at a desired level, such as 3.3 V, 2.5 V and other voltages. The DC-DC converter 210 converts the DC voltage outputted by the PFC controller to a different level of DC on a load (not shown) connected across two DC output voltage terminals according to the need of the load. Examples of the load may be a PC, a portable electronic device, and others. The SR switch used is off when the main power switch or main switch for short is on, and on when the main switch is off, and is typically a MOSFET. To prevent "shoot through" current that would flow if both switches were on at the same time, the switching scheme must be break-before-make; that is, the two switches must be driven in a complimentary manner with a small dead time between their conduction intervals.

DC-DC converters are often used with an electrical isolation transformer such as flyback transformer in switching power supplies. There are multiple types of isolated DC-DC converter using a transformer, such as flyback, forward, push-pull, half-bridge and full-bridge. A flyback transformer can be thought of as an inductor with an extra winding, such as used in the converter illustrated in FIG. 3. The energy is stored in the inductance of the primary winding during the on time of the drive circuit, which then transfers the energy to the secondary winding when the drive circuit is off. A forward transformer does not store energy, but simply transfers the energy from the input winding to the output winding. A forward transformer in a typical switching converter is driven by a push-pull driver or by alternately turning off half of 1) a single pair of transistor switches serially connected with two large capacitors connected in series across the DC input (half-bridge) or 2) a double pair of serially connected transistor switches (full-bridge), on the primary side.

Figure 7:
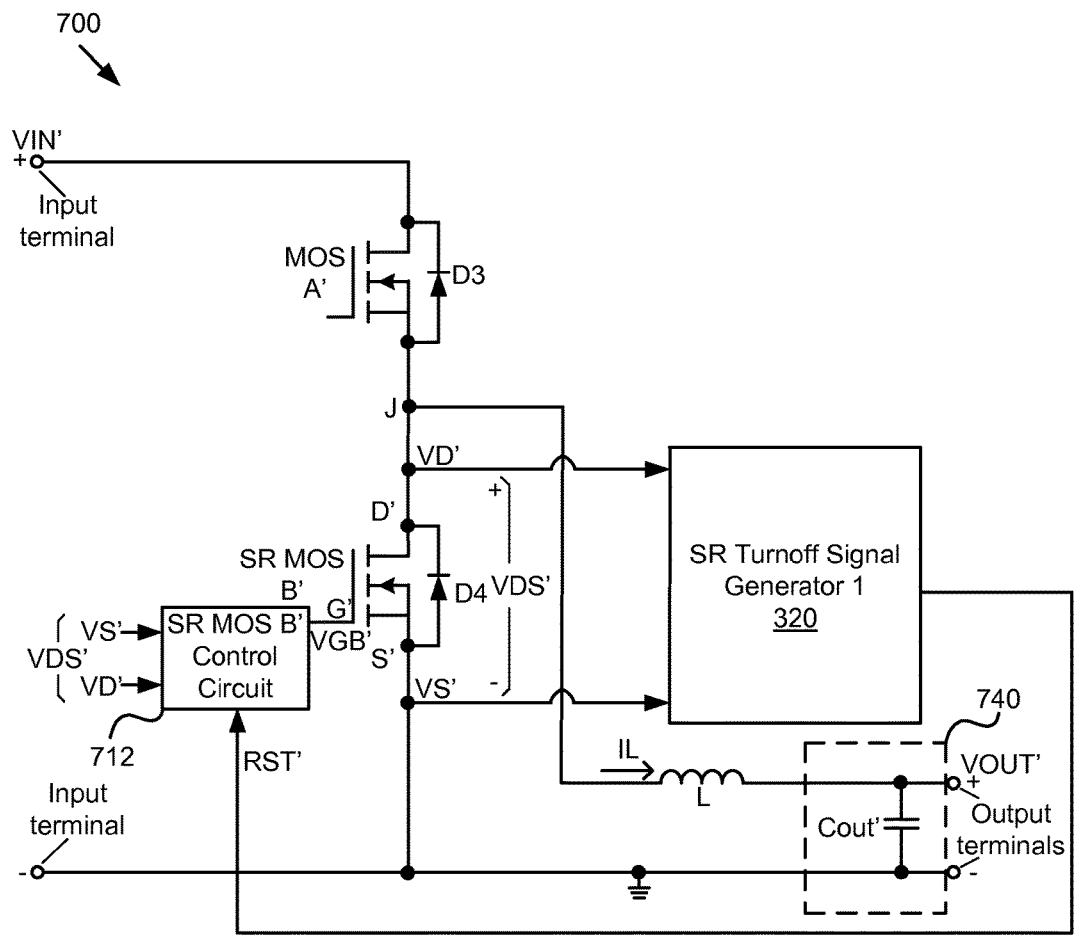
FIG. 7 is a schematic block diagram illustrating one embodiment of an exemplary self-synchronized non-isolated synchronous rectification DC-DC converter using the SR turn-off signal generator shown in FIG. 3 according to the present invention.

Non-isolated DC-DC converter topologies (without using transformers) commonly include buck converter, boost converter, and buck-boost converter. One embodiment of a typical buck converter circuit is shown in FIG. 7, wherein a main switch is disposed on a high side and an SR switch is on a low side, with the two switches connected in series at a switched node. There are a first input voltage (VIN') terminal and a return voltage terminal. The main switch is disposed between the input voltage terminals. Also, there are a first output voltage terminal (VOUT') and a return voltage terminal connected to ground, with an output capacitor Cout' connected across the two terminals. An inductor is connected from the switched node to the first output voltage terminal. Certain embodiments of boost and buck-boost converters have similar components and input/output characteristics, but have different configurations from that of the buck converter. With reference to FIG. 7, one embodiment of a boost converter may be visualized to have an SR switch on a high side and a main switch, on a low side, with one end of the main switch and one end of the SR switch connected in series also at a switched node. An inductor is connected from the switched node to the first input voltage (VIN') terminal. The other end of the main switch is connected to ground, and the other end of the SR switch, connected to the first output voltage terminal (VOUT"). Similarly, one embodiment of a buck-boost converter may be visualized to have a main switch connected to an SR switch in series at a switched node, with both switches disposed on a high side, and with the other end of the main switch connected to VIN' terminal and the other end of the SR switch connected to the first output voltage terminal (VOUT'). An inductor is connected between the switched node and ground.

FIG. 3 is a schematic block diagram illustrating one embodiment of an exemplary self-synchronized isolated synchronous rectification DC-DC converter 300 with one embodiment of an SR turn-off signal generator according to the present invention. The DC-DC converter 300 may be locatable in the switching power supply system 200 shown in FIG. 2 and is known as flyback converter. The DC-DC converter 300 may include a DC input voltage (VIN) terminal and a ground, a main switch MOS A, a synchronous rectifier switch SR MOSFET B abbreviated as SR MOS B, a flyback transformer 310, an SR MOS B control circuit 312, an SR turn-off signal generator 1 320, and an output module 340.

The flyback transformer 310 includes a primary winding 302 and a secondary winding 304 with winding turns Np and Ns, respectively. Typically, for a flyback converter, the orientation of phase dots in the transformer is reversed between the primary winding and the secondary winding. In the depicted embodiment, a distal end of the primary winding 302 is connected to the DC input voltage (VIN) terminal (also referred to as first input voltage terminal). A proximal end of the primary winding 302 is connected to the main switch MOS A. The main switch MOS A may use any other type of transistor than MOSFET as shown herein. As illustrated, MOS A is connected between the proximal end of the primary winding 302 and the ground. One end of SR MOS B, which is source S as shown, is connected to the secondary winding 304. Although SR MOS B is located on a high side, it may be located on a low side as well. Although SR MOS B shown is an n-channel enhanced MOSFET, a p-channel counterpart may also be used.

The SR MOS B control circuit 312 is a self-synchronized (also referred to as self-driven) controller, operating based on SR MOS B's drain-source voltage VDS and needing no input from the main switch MOS A. The SR MOS B control circuit 312 has an output connected to a gate control terminal G of SR MOS B, and is used to turn SR MOS B on based on the result of monitoring the drain-to-source voltage VDS of SR MOS B, and to turn it off upon receiving an SR turn-off signal RST outputted by the SR turn-off signal generator 1 320 once the latter is activated. The SR MOS B control circuit 312 and the SR turn-off signal generator 1 320 will be explained in detail in ensuing sections. The output module 340 has a DC output voltage (VOUT) terminal (also referred to as first output voltage terminal), a return voltage terminal (also referred to as second output voltage terminal) and an output-filter capacitor Cout connected between these two terminals. The distal end, where the drain D is, of the SR MOS B is shown directly connected to the output module at the output voltage (VOUT) terminal. A load (not shown) may be connected across these two terminals. The DC-DC converter 300 including those components can operate in both CCM and DCM, as illustrated in FIGS. 4a and 4b, respectively, and its operation may be made efficient and optimal as exemplarily illustrated in FIGS. 5a and 5b.

Figure 4A:
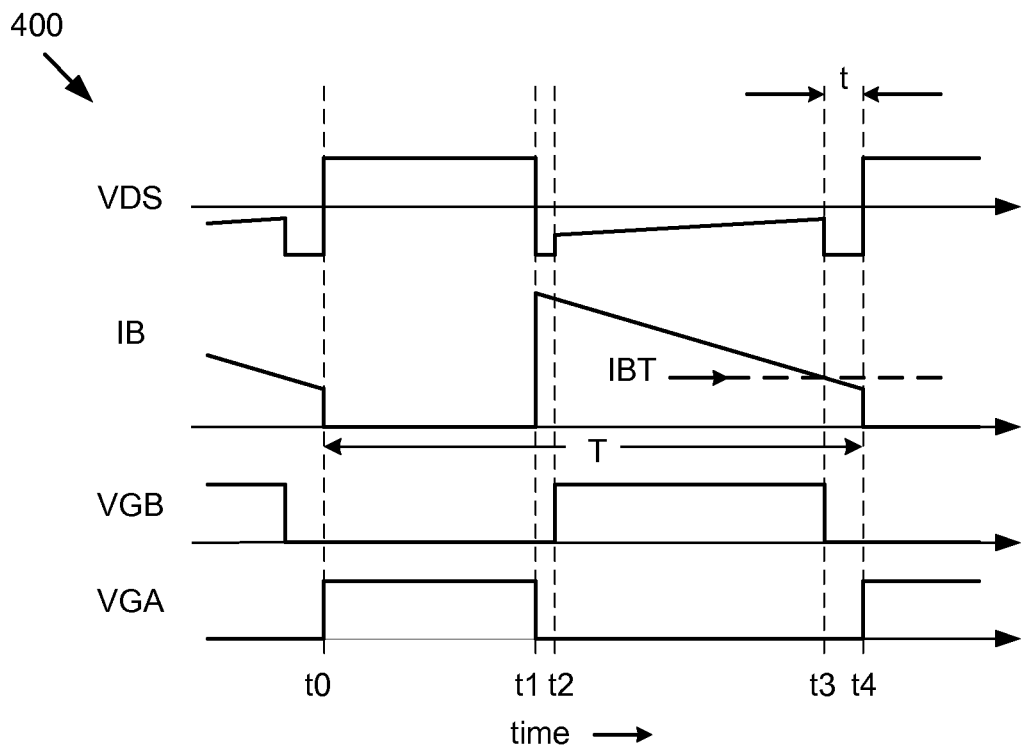
FIG. 4a illustrates an overview of voltage and current waveforms of the DC-DC converter shown in FIG. 3 operating in CCM according to the present invention.
Figure 4B:
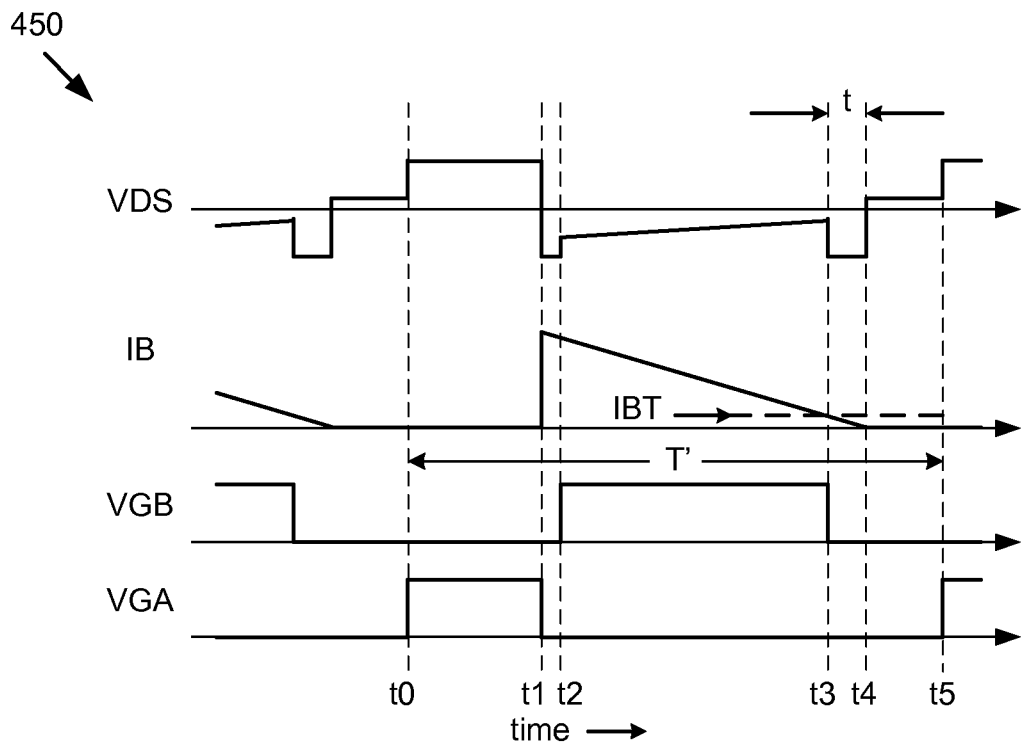
FIG. 4b illustrates an overview of voltage and current waveforms of the DC-DC converter shown in FIG. 3 operating in DCM according to the present invention.

FIG. 4a illustrates an overview 400 of voltage and current waveforms of the DC-DC converter 300 shown in FIG. 3 operating in CCM according to the present invention. As discussed previously, MOS A and SR MOS B are required to be driven to conduction complementarily with a small dead time between their conductions to avoid shoot through. The waveform overview 400 depicts this requirement being fulfilled. As illustrated, the time period T of a switching cycle consists of five (5) time points beginning with t0, continuing to t1, t2, t3 and ending with t4. Events that occur at each of these time points and during each interval between two time points are described below.

At t0, MOS A is turned on when its gate voltage VGA goes high as under the control of a primary side controller (not shown) while the gate voltage VGB of SR MOS B is zero, keeping SR MOS B off. The input voltage VIN is applied to the primary winding 302 of the transformer 310. The voltage on the secondary winding 304 is VIN/n, where n is the turn ratio Np/Ns. The drain-to-source voltage VDS of SR MOS B is VIN/n+VOUT. Because SR MOS B is already off (VGB=0), the positive voltage VDS causes the body diode D2 of SR MOS B to keep SR MOS B off. The body diode D2 is an inherent PN diode anti-parallel to the MOSFET transistor and is used mainly in very low frequency applications, wherein anti-parallel means parallel but moving or oriented in different directions. There is no current through SR MOS B channel or the body diode D2, and so the SR current IB=0.

Between time points t0 and t1, MOS A is on. The magnetizing current (not shown in FIG. 3) in the transformer 310 is reflected to the primary winding 302. Because VIN is applied to the primary winding 302, the transformer 310 magnetizing current (also MOS A current) increases.

At t1, MOS A is turned off. The primary winding 302 current is cut off. The transformer 310 magnetizing current needs to find another path to continue. So, it flows out of the secondary winding 304 through the body diode D2 to the VOUT terminal. Because said magnetizing current increases during this interval, IB at t1 is higher than IB at t0.

Between time points t1 and t2, the body diode D2 of SR MOS B carries the current IB. The VDS of SR MOS B is the forward voltage drop of D2. IB decreases during this interval because the voltage Vsec applied to the secondary winding 304 is (−VOUT+VDS), which is <0 because −VOUT<0 and VDS<0 (because VD is lower than VS since the current flows from the source to the drain). Initially IB is strong, and it then ramps down toward zero while the stored energy of the secondary winding 304 is being discharged into the output-filter capacitor Cout. The interval between t1 and t2 is a very short dead time. It is not the focus of the description of the present invention. Since it is much shorter than MOS A on time, it can be readily blanked out.

At t2, which follows said dead time, after the primary gate voltage VGA already transitioned to low, SR MOS B is turned on because its gate voltage VGB goes high. This is due to the output of the SR MOS B control circuit 312 which may be activated, for example, when the voltage VDS of SR MOS B is sensed falling below a threshold voltage. This change in VDS indicates that MOS A has switched off. In this manner SR MOS B control circuit 312 may output the gating signal VGB to SR MOS B and provide both the on time and dead time (t1 to t2) needed to rectify and provide the voltage at the output VOUT. Because the "on" resistance Rdson of SR MOS B is low, VDS is reduced to (IB×Rdson). The current IB is shifted from the body diode D2 to SR MOS B channel.

Between time points t2 and t3, SR MOS B stays on. IB continues to decrease due to Vsec (=−VOUT+VDS) applied on the secondary winding 304. Because VDS is small compared to VOUT, the slope of the IB waveform is approximated to be constant although there is some small variation due to the change in VDS and VOUT: VDS decreases as IB decreases and VOUT increases slightly as current flows into the output-filter capacitor Cout.

At t3, SR MOS B is turned off. IB is shifted from SR MOS B back to its body diode D2. IB is observed to cross a threshold current IBT at which SR MOS B is turned off. VDS increases from (IB×Rdson) to the conducting body diode D2 forward voltage drop. As will be demonstrated later, the time point t3 may be made to occur sooner or later than shown for purposes of optimizing the body diode D2 conduction time in a subsequent switching cycle with the period T. In other words, the conduction time of SR MOS B may be made shorter or longer for optimal operations from one cycle to the next cycle. Note that too low IBT may cause shoot through between MOS A and SR MOS B. This is considered dangerous because of the possibility of damaging MOSFET. In a practical implementation, IBT is started high with big margin to avoid shoot through initially, which translates to longer body diode conduction time. However, it is a safer approach even though it causes more power dissipation initially.

Between time points t3 and t4, the body diode D2 of SR MOS B carries current IB. This is the body diode conduction time t. This interval is similar in nature to that of t1 to t2 except for the smaller IB and a longer interval time. This body diode D2 conduction time t constitutes the total dead time before MOS A is turned on again when operating in CCM and is only a part of the dead time when operating in DCM, which is illustrated in FIG. 4b.

FIG. 4b illustrates an overview 450 of voltage and current waveforms of the DC-DC converter 300 shown in FIG. 3 operating in DCM according to the present invention. Similar to those waveforms of the overview 400, the overview 450 includes waveforms for voltage and current of the DC-DC converter 300 within a complete cycle with a period T' (which may or may not be equal to T, depending on the control method used on the primary side to determine when a next switching cycle begins). However, herein there are six time points within the cycle: t0, t1 . . . t5. The load is presumably lighter. At light load, the control method of the primary side could reduce the peak current or extend the period or do both to reduce the average current delivered to the output. In any case, the DC-DC converter 300 will go into DCM operation at light load. The events that occur at those time points and each interval between two time points are described below.

Events occurring between time points t0 and t3 are the same as those of the overview 400 shown in FIG. 4a. At t4, the SR current IB decreases to zero. Between time points t4 and t5, both MOS A and SR MOS B are off. The transformer 310 magnetizing current is zero during this interval. Actually, the parasitic LC components in the circuit will cause the drain-to-source voltage VDS of SR MOS B to ring beginning at t4. To simplify the discussion, those ringing effects are ignored in FIG. 4b; only the settled voltage waveform of VDS is shown. Because both MOS A and SR MOS B are off and there is no current flowing in the transformer 310, both voltages on the primary winding 302 and the secondary winding 304 are zero. SR MOS B VDS will be settled to VOUT if this interval is long enough. Note that until MOS A is turned on again at t5, the total dead time begins at t3 and ends at t5, which includes the body diode D2 conduction time lasting from t3 to t4.

Figure 5A:
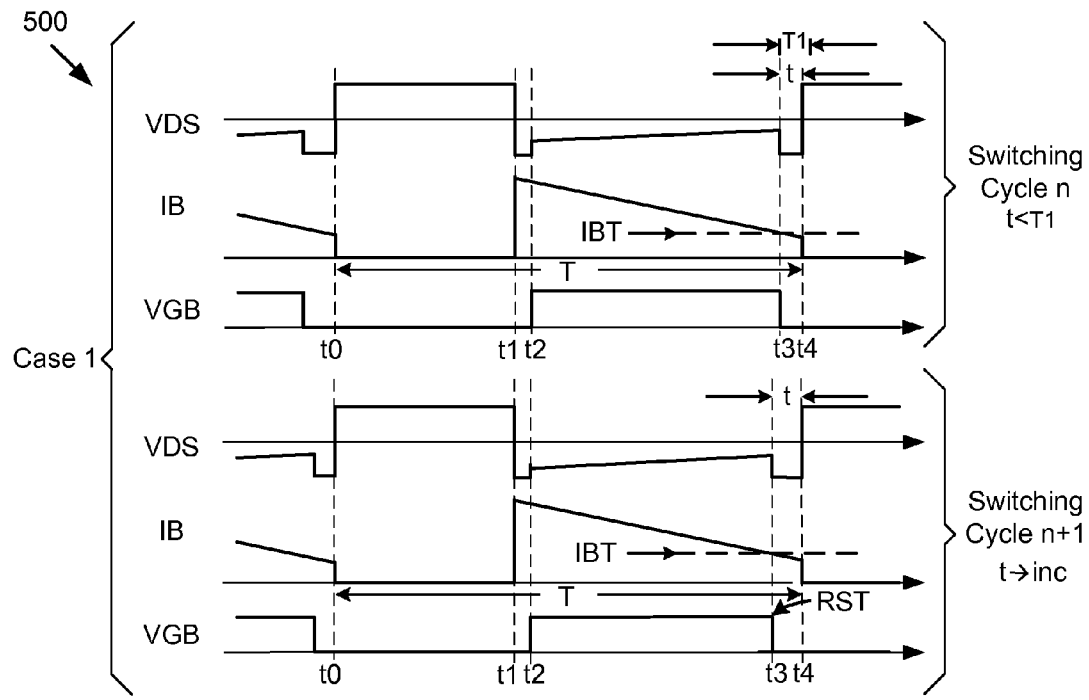
FIG. 5a illustrates case 1 voltage and current waveforms of the DC-DC converter shown in FIG. 3 operating in CCM before and after using the shown SR turn-off signal generator according to the present invention.

FIG. 5a illustrates case 1 500 voltage and current waveforms of the DC-DC converter 300 shown in FIG. 3 operating in CCM before and after using the shown SR turn-off signal generator 1 320 according to the present invention. Herein the waveform shapes are basically the same as shown in FIG. 4a. Although a dead time is needed, for example, between the turn-off of SR MOS B and the next turn-on of MOS A to avoid shoot through, the dead time may lead to efficiency degradation. Neither too long nor too short a dead time is conducive to power efficiency. Too long a dead time results in additional losses due to the body diode D2 conduction and body diode D2 reverse recovery. Too short a dead time results in simultaneous conduction of the main switch MOS A and SR MOS B, with even more adverse penalties in the converter efficiency. As seen from FIGS. 4a and 4b, the body diode D2 conduction time t is the total or part of a dead time, respectively. Optimizing this conduction time t will tend to maximize power efficiency at the same time meeting the break-before-make switching need. As such, a selected fixed optimum time period T1, for example, in the range of 10 to 100 ns, can be used as a regulation target with which to optimize the body diode D2 conduction time t, and thereby the dead time. The exact value of T1 is not important if allowance of certain time of body diode D2 conduction after SR MOS B is turned off is assured in every switching cycle. Note that if t is equal to T1 by chance, nothing needs to be done. In reality, t will tend to deviate from T1 due to various perturbation even if t happened to be equal to T1 at a certain time. Monitoring of t is on going, and the optimization process kicks in whenever t becomes unequal to T1.

In case 1 500, the body diode D2 conduction time t is shorter than T1 (that is, t<T1) in switching cycle n as illustrated, and this cycle is assumed to be the initial condition, before any optimization, for purposes of discussion here. Based on this finding, the SR turn-off signal generator 1 320 generates the SR turn-off signal RST to end the conduction of SR MOS B incrementally sooner in the next switching cycle (n+1) than in the switching cycle n, so that the body diode D2 conduction time t will be incremented to be in closer proximity to T1 in length. As depicted, in this cycle, the time point t3 is pushed slightly to the left for a short distance, and the SR MOS B turn-off threshold current IBT is slightly larger (that is, at a higher point on the IB ramp). This optimization process is carried out from cycle to cycle, so that eventually t will be substantially equal to T1. There is a possibility that t sometime becomes somewhat longer than T1 in duration. When this happens, a case 2 event as illustrated in FIG. 5b will take place, causing t to go the other way.

Figure 5B:
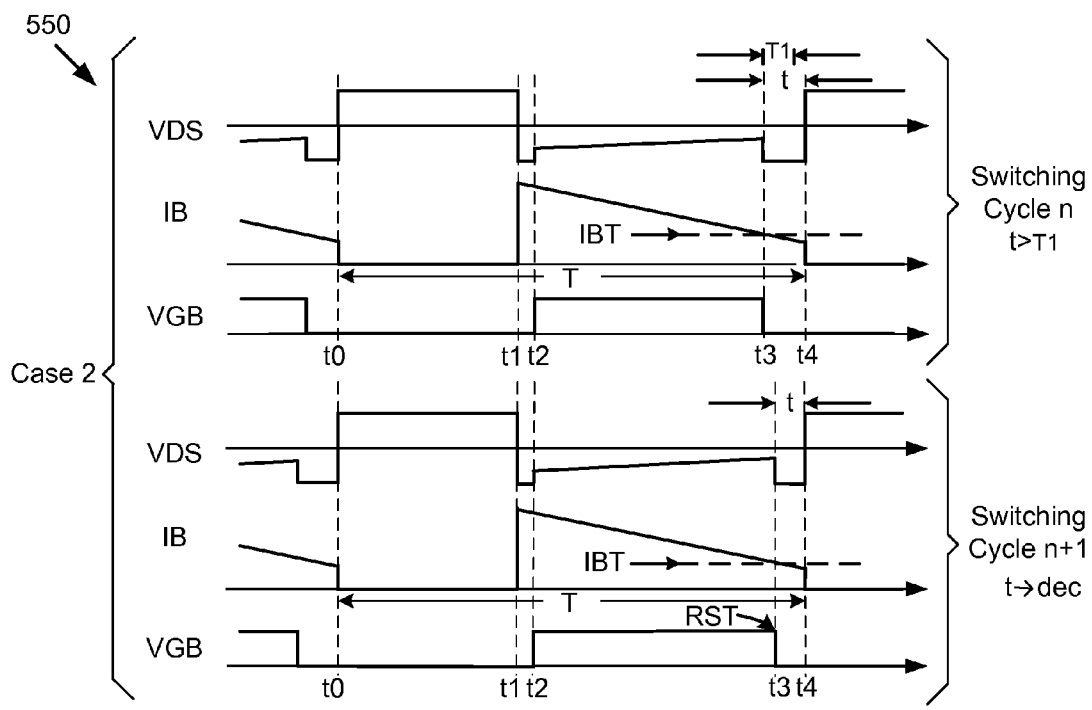
FIG. 5b illustrates case 2 voltage and current waveforms of the DC-DC converter shown in FIG. 3 operating in CCM before and after using the shown SR turn-off signal generator according to the present invention.

FIG. 5b illustrates case 2 550 voltage and current waveforms of the DC-DC converter 300 shown in FIG. 3 operating in CCM before and after using the shown SR turn-off signal generator 1 320 according to the present invention. As shown, the body diode D2 conduction time t is longer than T1 (that is, t>T1) in switching cycle n (initial condition). Therefore, in switching cycle n+1, the SR turn-off signal generator 1 320 provides the SR turn-off signal RST that moves the end point of SR MOS B conduction at t3 slightly to the right, so that t3 is somewhat closer to t4. Thus, the body diode D2 conduction time t is decremented so as to be in closer proximity to T1 in length. As in case 1 500, the change in body diode D2 conduction time in case 2 550 is generally small. Eventually, body diode D2 conduction time t may be made substantially equal to T1 after a number of cycles. There is also a possibility that t sometime decreases to the point at which t is rather shorter than T1 in duration. When this happens, a case 1 event as illustrated in FIG. 5a will take place, causing t to go the other way. Thus, the duration of t may fluctuate about the duration of T1, as pointed out in the description of said case 1 and case 2.

Figure 6A:
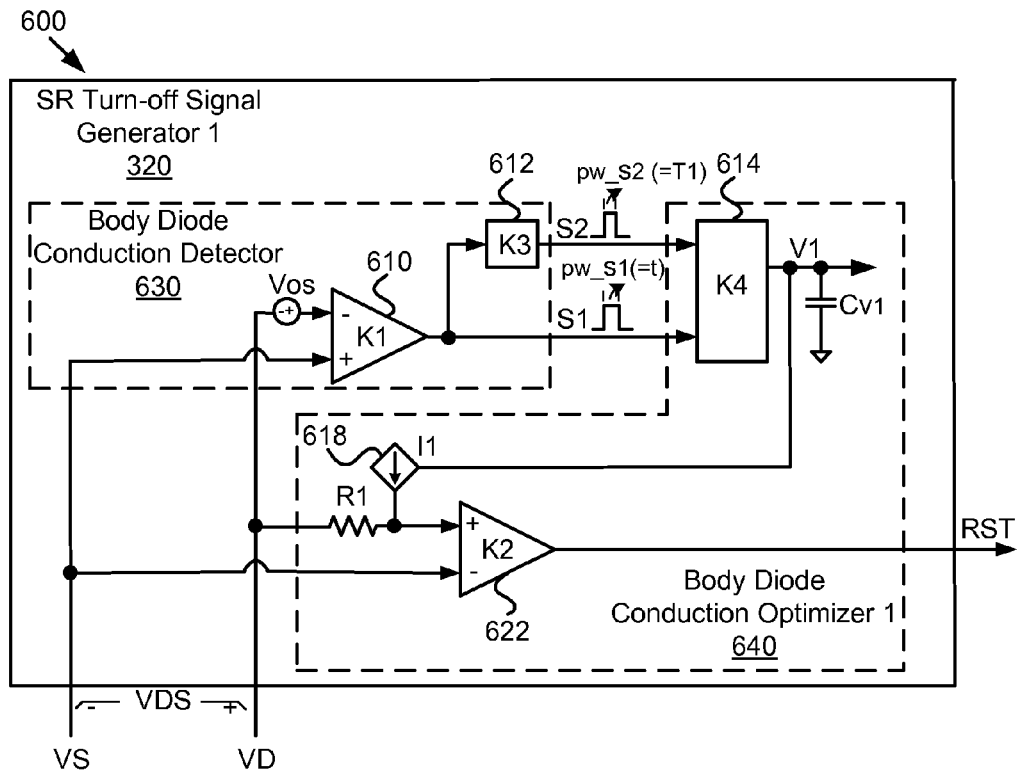
FIG. 6a is a schematic block diagram illustrating one embodiment of components of the SR turn-off signal generator shown in FIG. 3 according to the present invention.

FIG. 6a is a schematic block diagram illustrating one embodiment of components 600 of the SR turn-off signal generator 1 320 shown in FIG. 3 according to the present invention. The SR turn-off signal generator 1 320 not only generates the SR turn-off signal RST but also serves to optimize the body diode D2 conduction time t following the end of SR MOS B conduction, so that t becomes approximately equal to T1. Note that hereinafter, in general, the symbolic name of a circuit element such as resistor R, capacitor C, inductor L, voltage source V, and current source I, is assumed to have a resistance of R ohms, capacitance of C farads (or microfarads), inductance of L henrys, voltage of V volts, and current of I amps, respectively, unless otherwise specified. In the disclosed embodiment, the components 600 of the SR turn-off signal generator 1 320 include a body diode D2 conduction detector 630 and a body diode D2 conduction optimizer 1 640. The body diode D2 conduction detector 630 includes a voltage comparator K1 610 and a single-pulse generator K3 612. The body diode D2 conduction optimizer 1 640 includes a pulse-width comparison module K4, a capacitor Cv1, a feedback loop including current source I1 and resistor R1, and a voltage comparator K2 622.

In switching cycle n, the voltage comparator K1 610 has the source voltage VS of SR MOS B on the non-inverting input and the drain voltage VD of SR MOS B on the inverting input. A certain offset voltage Vos is added to VD to assure that VS can exceed VD by Vos. As soon as this exceeding occurs, starting at the time point t3 (FIG. 4a), the output of the voltage comparator K1 610 goes from low to high and stays high until this exceeding terminates at the time point t4, thus generating a first pulse named S1, and its pulse width pw_S1 is the body diode D2 conduction time t, as depicted. The rising edge of S1 triggers the single-pulse generator K3 612 to generate a second pulse named S2, using a one-shot monostable multivibrator, for example. An appropriate RC network connected therein produces a constant S2 pulse with its width pw_S2 equal to T1, which is also depicted. Note that the leading edges of S1 and S2 are synchronously aligned.

Figure 6B:
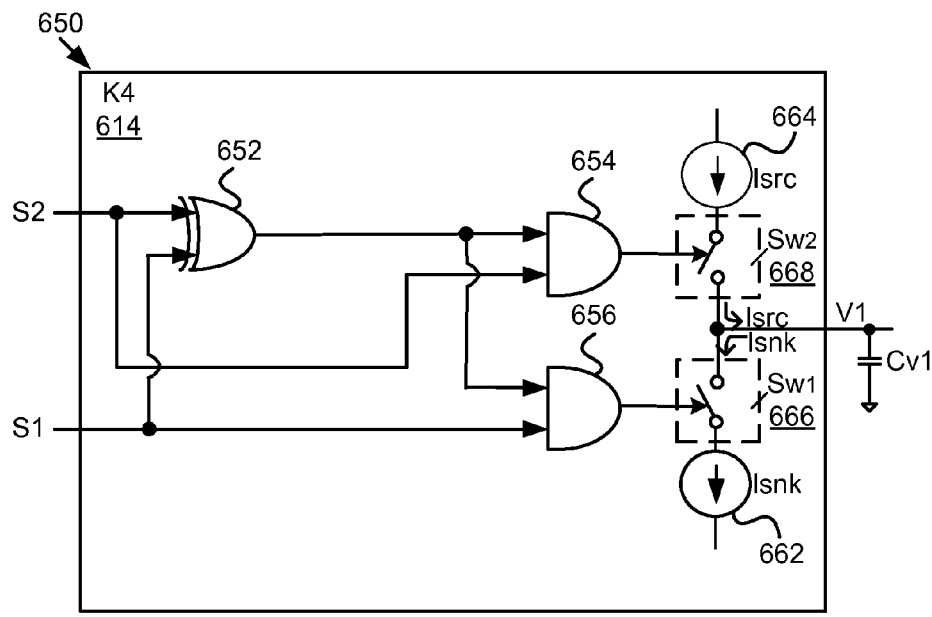
FIG. 6b is a schematic block diagram illustrating one embodiment of a pulse-width comparison module included in the SR turn-off signal generator shown in FIG. 6a according to the present invention.

The pulse-width comparison module K4 614 compares the pulse width pw_S1 and the pulse width pw_S2 with an XOR gate 652 and outputs either a charging current Isrc or a discharging current Isnk (all shown in FIG. 6b). Isrc and Isnk may or may not be equal to each other in the amount of current. Since the leading edges of pulses S1 and S2 are synchronously aligned, only the trailing edges thereof are compared to determine which one terminates last. Current Isrc charges and current Isnk discharges the capacitor Cv1, which is connected between the output terminal of the pulse-width comparison module K4 614 and ground with a voltage V1 between its two plates, depending on whether pw_S1 is shorter or longer than pw_S2 (that is, t<T1 or t>T1) in switching cycle n. The voltage V1 is accordingly incremented or decremented by an amount equal to Isrc×(a certain time segment 1)/Cv1 or Isnk×(a certain time segment 2)/Cv1, respectively. Said two time segments are not necessarily equal. Note that this calculation is based on "Ohm's law for a capacitor": the amount of current through a capacitor is a product of the capacitance and the rate of change over time in voltage across it, and that when dealing with "straight-line segments", the general capacitor equation may be written in terms of increments (or decrements) during the given time segment as: I=C×Δv/Δt, where I=constant current through the capacitor, C=capacitance, Δv=change in voltage across the capacitor, and Δt=a selected certain time segment, thus Δv=I×Δt/C. Note that the voltage change in V1 is made relatively small in each switching cycle to ensure loop stability.

The feedback loop originated from the output of the pulse-width comparison module K4 614 is provided by the current source I1 and the resistor R1. I1 is a voltage-controlled current source that is controlled by voltage V1. The higher V1, the higher I1. Current I1 flowing through resistor R1 connected to a circuit element such as the input to the voltage comparator K2 622 generates a voltage drop equal to I1×R1. This voltage drop added to the drain voltage VD is applied to the non-inverting input of the voltage comparator K2 622.

The voltage comparator K2 622 is used as a fast current comparator operating at a rather high speed, with propagation delay of a few nano-seconds ("ns"), for example, 4-5 ns. The source voltage VS is applied to the inverting input of the voltage comparator K2 622. The output RST of the voltage comparator K2 622 representing the SR MOS B turn-off signal goes from low to high when (I1×R1+VD) exceeds VS. Algebraically, I1×R1>VS−VD, or I1×R1>VDS. The voltage comparator K2 622 is typically activated only during SR MOS B on time (between t2 and t3 with reference to waveforms in FIGS. 5a and 5b). In switching cycle n+1, during the time interval between t2 and t3, SR MOS B VDS=IB×Rdson. To generate the SR turn-off signal RST, the trigger point is when I1×R1=VDS=IBT×Rdson, wherein the IB threshold current IBT (=I1×R1/Rdson) can be adjusted by adjusting I1.

Based on the above discussed control mechanism, if, in switching cycle n, body diode D2 conduction time t (between t3 and t4), which equals pw_S1, is shorter than pw_S2 (=T1), the output voltage V1 of the pulse width comparison module K4 614 increments, causing I1 to increase, thus increasing IBT. From FIG. 5a, it can be seen that in switching cycle n+1, the body diode D2 conduction time t increases if IBT increases. On the other hand, if pw_S1 is longer than pw_S2, the output voltage V1 decrements, causing I1 to decrease, thus decreasing IBT. From FIG. 5b, it can be seen that in switching cycle n+1, the body diode D2 conduction time t decreases if IBT decreases. With this control mechanism, the body diode D2 conduction time t is optimized to be closer to T1 in duration.

FIG. 6b is a schematic block diagram illustrating one embodiment of components 650 of the pulse-width comparison module K4 614 included in the SR turn-off signal generator 1 320 shown in FIG. 6a according to the present invention. Components 650 include an XOR (exclusive OR) gate 652, two AND gates 654 and 656, two switches: Sw1 666 and Sw2 668, and two current sources: Isnk 662 and Isrc 664. Inputs to the pulse-width comparison modules 614 include pulse S1 and pulse S2, and the output of said module includes the output voltage V1 with an outflow current Isrc/inflow current Isnk to/from the connected external capacitor Cv1.

The XOR gate 652 outputs a logical 1 (high) only if the trailing edges of the two input pulses S1 and S2 are at different levels, that is, one input is high and the other input is low; otherwise, the output is a logical 0 (low). When the output of the XOR gate 652 is high and S2 is high, the output of the AND gate 654 becomes high, closing Sw2 668, which indicates the pw_S1 is shorter than the pw_S2 (i.e. t<T1). Thus, K4 614 outputs Isrc charging the capacitor Cv1, and V1 will increment. On the other hand, when the output of the XOR gate 652 is high and S1 is high, the output of the AND gate 656 becomes high, closing Sw1 666, which indicates the pw_S1 is longer than the pw_S2 (i.e. t>T1). Thus, K4 614 outputs Isnk discharging the capacitor Cv1, and V1 will decrement. While the appropriate switch is closed, the amount of change in the voltage V1 is as discussed above. However, while the upper limit of Sw2 668 closing time is T1, the upper limit of Sw1 666 closing time may need downsizing so as to avoid overdischarging of the capacitor Cv1 in order to maintain loop stability. If the pw_S1 is equal to the pw_S2, then V1 will not increase or decrease, and the output of the voltage comparator K2 622 will occur at the same time point as the latest counterpart in the switching cycle. That means that the duration of t is optimized to be equal to that of T1 as long as the two pulse widths are equal.

FIG. 7 is a schematic block diagram illustrating one embodiment of an exemplary self-synchronized non-isolated synchronous rectification DC-DC converter 700 using the SR turn-off signal generator 1 320 shown in FIG. 3 according to the present invention. The DC-DC converter 700, also known as a synchronous buck converter and locatable in the switching power supply system 200 as shown in FIG. 2, includes a pair of input terminals having a DC input voltage VIN' (also referred to as first input voltage terminal) relative to ground (also referred to as second input voltage terminal), a high-side main switch MOS A', a low-side SR MOS B' (switch), a SR MOS B' control circuit 712, the SR turn-off signal generator 1 320, an inductor L, and an output module 740. Herein the main switch may also use a different type of transistor than the shown MOS A' (n-channel MOSFET). Its gate drive circuitry is not shown.

As illustrated, SR MOS B' is an n-channel MOSFET although it may use another type of transistor as well. Unlike the flyback synchronous DC-DC converter 300, no transformer is used in the DC-DC converter 700. The main switch MOS A' and SR MOS B' are directly connected in series at a switched node J with a pair of electrical leads, instead of being connected through a flyback transformer. During the off times of MOS A', SR MOS B' conducts current in its third quadrant because the current flows from the source S' to the drain D', which results in a negative bias across the switch. A positive voltage at the gate of SR MOS B' still enhances the channel. A time interval referred to earlier as dead time needs to be inserted between two gate driving signals for the two switches to prevent shoot through. Herein shoot through is referred to as the condition when both MOSFETs are either fully or partially turned on at the same time, providing a path for current to "shoot through" from VIN' to ground, resulting in reduction of system efficiency. Similar to the DC-DC converter's 300 current and voltage waveforms shown in FIG. 4a, there are two dead times for the DC-DC converter 700 as well during which the body diode D4 of SR MOS B' conducts. As with the former converter, the focus of this description is on the second dead time; that is, after the end of MOS B' conduction and before the start of MOS A' conduction, in a similar manner to what is illustrated in FIG. 4a (during the time interval of t3 to t4 for the flyback synchronous DC-DC converter 300 operating in CCM). Throughout either dead time the body diode D4 of SR MOS B' conducts.

The SR MOS B' control circuit 712 is also a self-synchronized controller, operating based on the drain-source voltage VDS' of SR MOS B' and needing no signal from the main switch MOS A'. The SR MOS B' control circuit 712 has an output connected to the gate terminal G' of SR MOS B', and is used to turn SR MOS B' on based on the result of monitoring the drain-to-source voltage VDS' of SR MOS B', and to turn it off upon receiving an SR turn-off signal RST' outputted by the SR turn-off signal generator 1 320 during the optimization process of the body diode D4 conduction time. Herein the SR turn-off signal generator 1 320 includes the same components 600 as illustrated in FIGS. 6*a* and 6*b*, but with input voltages VD' and VS' at the drain and source of SR MOS B', respectively, and an output voltage RST'. Since functions of those components have been previously discussed in detail, they are not repeated herein.

The output module 740 has a DC output voltage (VOUT') terminal (also referred to as first output voltage terminal), a return voltage terminal (also referred to as second output voltage terminal) connected to ground, and an output-filter capacitor Cout' connected between the two terminals. A load (not shown) may be connected across the two terminals. In addition, the output module 740 is connected to one end of the inductor L at the output voltage (VOUT') terminal. The other end of the inductor L is connected to the switched node J, where MOS A' and SR MOS B' meet. Thus, the distal end of SR MOS B' is connected to the output module through the inductor L. Turning MOS A' on puts VIN' on one end of the inductor L, which will tend to cause the inductor current IL to rise (because of the positive voltage across the inductor L), thus delivering energy to the inductor L and to the load.

When MOS A' turns off, the energy in the inductor L forces current IL to circulate through the load and the body diode D4 of SR MOS B'. While MOS A' is off and SR MOS B' is on, one end of the inductor L is essentially connected to ground, so current IL flows from ground to the load. The inductor current IL decreases due to the negative voltage across the inductor L, and energy stored in the inductor L is discharged into the load. Herein the effective switch is MOS A', which dictates when to build up energy in the inductor L and when to force the inductor current I to start freewheeling. During the dead times, the inductor current IL flows through the body diode D4 of SR MOS B' and develops stored charge in the depletion region. This stored charge must sweep out to allow the body diode D4 to recover its forward-blocking characteristic. In some cases, a Schottky diode may be placed in parallel with SR MOS B' to improve the converter efficiency slightly, which is beyond the scope of this description.

SR MOS B' is turned on just after the body diode D4 goes into conduction, resulting in the current being transferred from the body diode D4 to the active region of SR MOS B', and it is turned off just before the main switch MOS A' is turned on. The inductor L and the capacitor Cout' act as a low pass filter to restore a nearly constant output voltage Vout'. Note that MOS A' conducts to transfer energy from the input, and SR MOS B' conducts to circulate the inductor current I. The DC-DC converter 700 including those components described above can also be made to operate efficiently and optimally, like the DC-DC converter 300, using the SR turn-off signal generator 1 320, as illustrated in FIGS. 5*a* and 5*b*.

Figure 8:
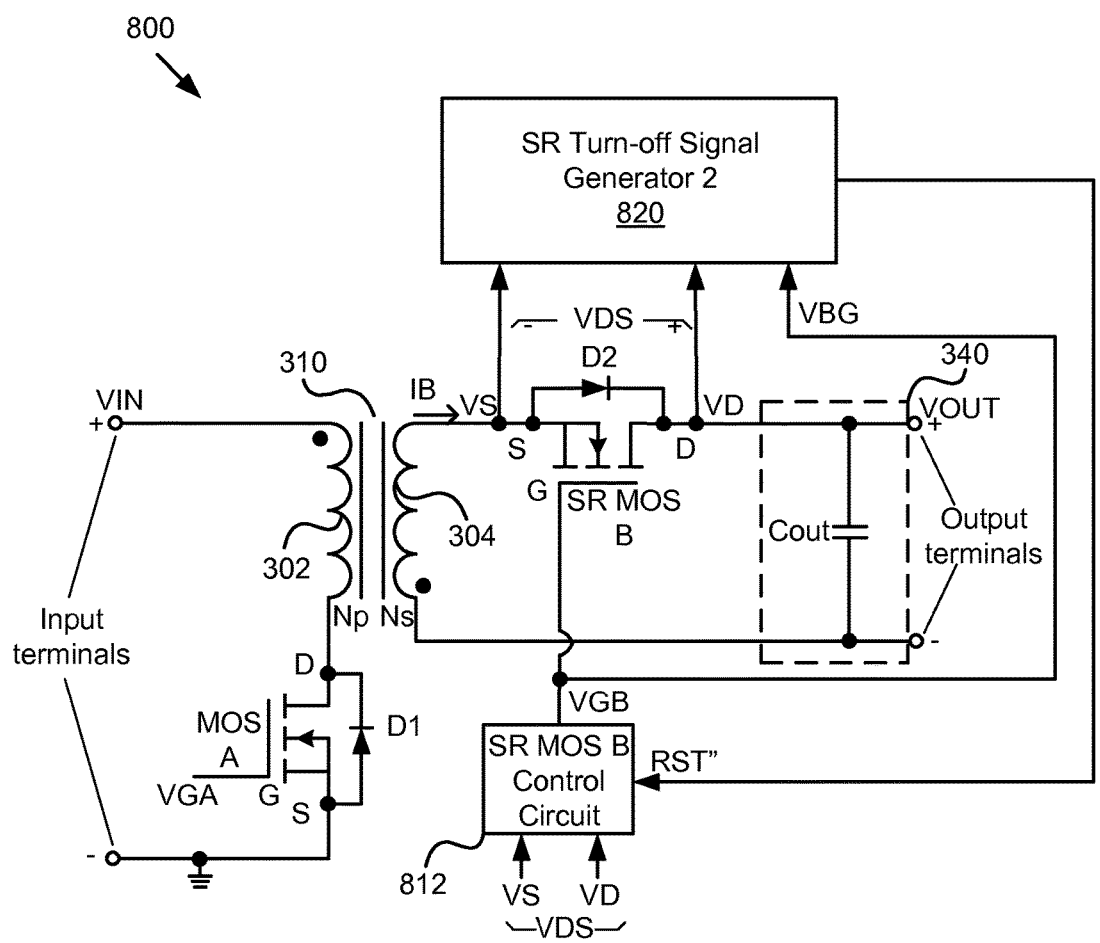
FIG. 8 is a schematic block diagram illustrating a self-synchronized flyback synchronous rectification DC-DC converter like that of FIG. 3 with an alternative embodiment of the SR turn-off signal generator thereof according to the present invention.

FIG. 8 is a schematic block diagram illustrating a self-synchronized flyback synchronous rectification DC-DC converter 800 like that of FIG. 3 with an alternative embodiment of the SR turn-off signal generator thereof according to the present invention. This alternative embodiment is referred to herein as SR turn-off signal generator 2 820. Although herein an isolated topology is featured to demonstrate the functions of the SR turn-off signal generator 2 820, a non-isolated counterpart such as the DC-DC converter 700 may also be applicable. The DC-DC converter 800 includes the same components included in the DC-DC converter 300, except for the following substitutions: 1. SR turn-off signal generator 2 820 for SR turn-off signal generator 1 320, and the output signal RST' of the former for the output signal RST of the latter; and 2. SR MOS B control circuit 812 with an input signal RST' for SR MOS B control circuit 312 with the input signal RST as shown in FIG. 3. Otherwise, the SR MOS B control circuit 812 is configured and functions just like the SR MOS B control circuit 312. Like the counterpart DC-DC converter 300, the DC-DC converter 800 is locatable in the switching power supply system 200 shown in FIG. 2.

Figure 9:
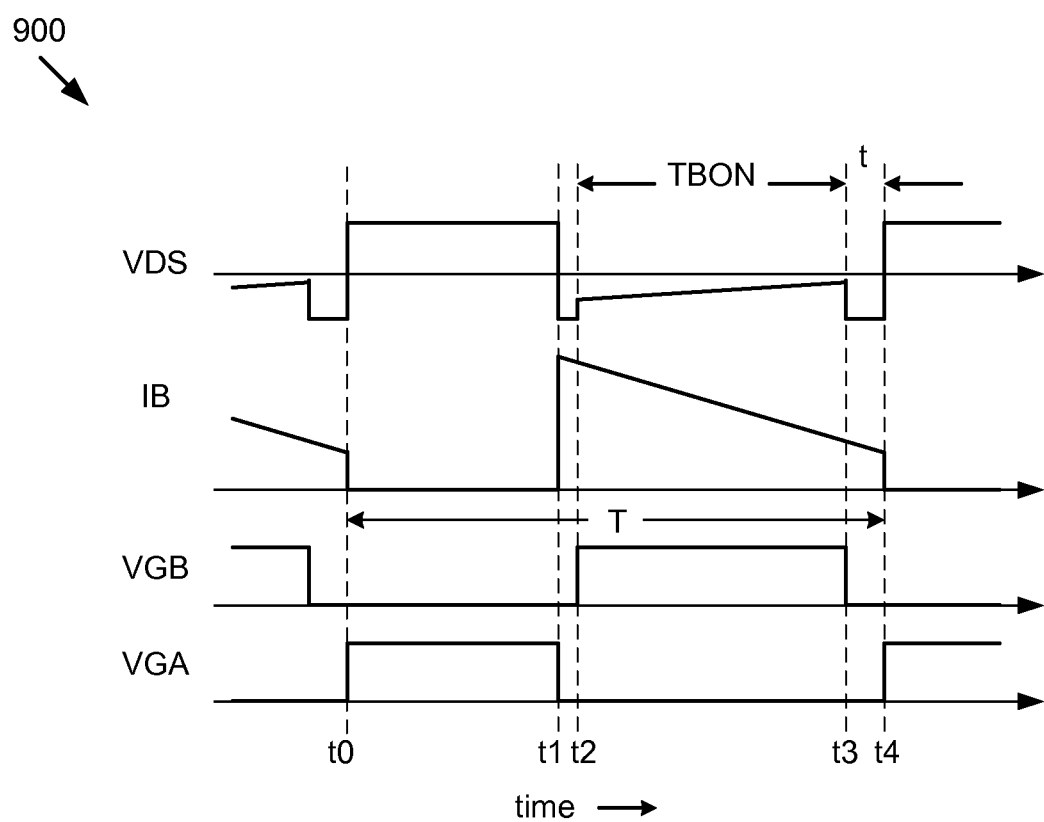
FIG. 9 illustrates voltage and current waveforms of the DC-DC converter shown in FIG. 8 operating in CCM according to the present invention.

As described previously, FIGS. 5*a* and 5*b* show a control method of adjusting the SR current threshold IBT (at the end of the conduction of SR MOS B) with respect to the body diode D2 conduction time t for optimization using the SR turn-off signal generator 1 320. With the SR turn-off signal generator 2 820, however, the SR MOS B on time TBON, which is the entire duration of the SR MOS B conduction (from the beginning to the end) taken as a whole, as depicted in FIG. 9, is adjusted for the body diode D2 conduction time t optimization. The target of these two control methods is the same: to control the length of t. A description of the components of the SR turn-off signal generator 2 820, which are illustrated in FIGS. 10*a* and 10*b*, can be found in following sections.

FIG. 9 illustrates voltage and current waveforms of the DC-DC converter 800 shown in FIG. 8 operating in CCM according to the present invention. Herein the shape and breakdown of cycle timing of voltage and current waveforms for the main switch MOS A and SR MOS B are similar to those shown in FIG. 4*a*. The only notable difference is that the former includes the indication of TBON, which is the entire on time of SR MOS B, while the latter indicates the threshold current IBT, the SR current value at the end of the conduction of SR MOS B. Each of these two indications presents its respective focal point of the body diode D2 conduction time t optimization technique. Since discussion of the significance of each cycle timing point depicted in FIG. 4*a* has been presented, no repetition is given herein.

Figure 10A:
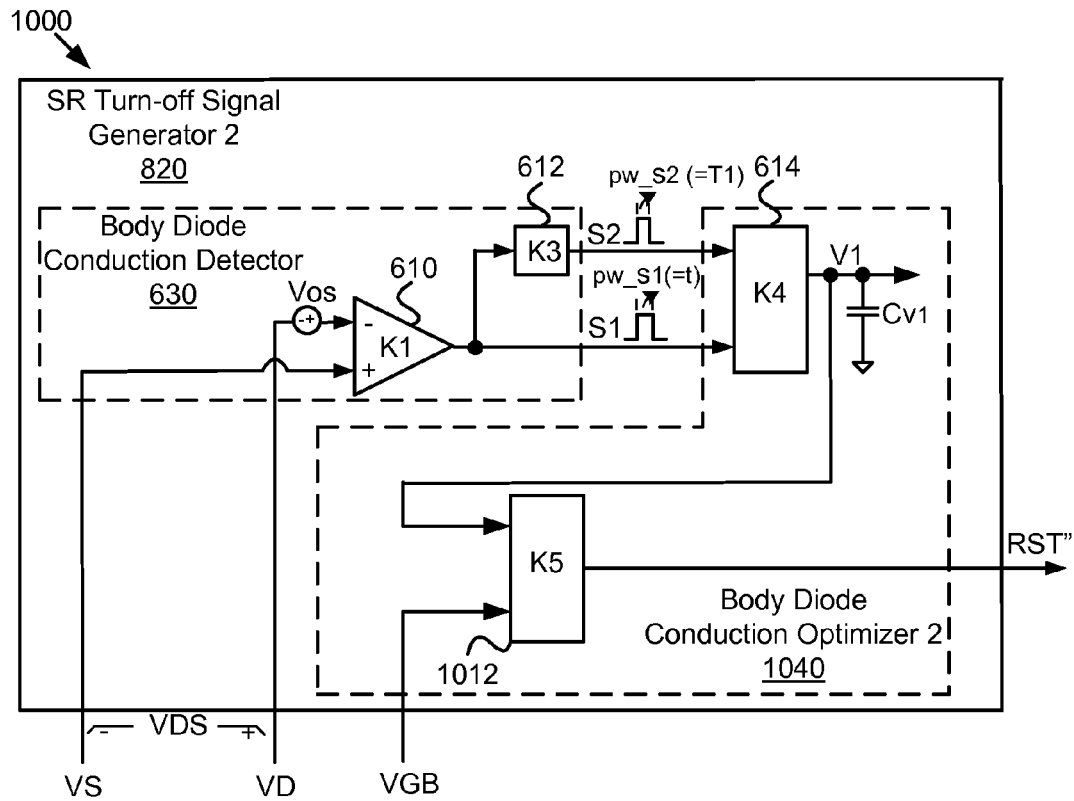
FIG. 10a is a schematic block diagram illustrating one embodiment of components of the SR turn-off signal generator shown in FIG. 8 according to the present invention.

FIG. 10*a* is a schematic block diagram illustrating one embodiment of components 1000 of the SR turn-off signal generator 2 820 shown in FIG. 8 according to the present invention. Similar to the components 600 of the SR turn-off signal generator 1 320 shown in FIG. 6*a*, the components 1000 include the body diode conduction detector 630 and a body diode conduction optimizer 2 1040. Since the body diode conduction detector 630 has been discussed previously, no repetition is made herein. The body diode conduction optimizer 2 1040 includes the pulse-width comparison module K4 614, the capacitor Cv1, which two components have been discussed previously, and a voltage comparison sub-module K5 1012. The two inputs of K5 1012 are the gate voltage VGB of SR MOS B and the voltage V1 across the capacitor Cv1. RST", an output voltage of K5 1012, will be inputted to the SR MOS B control circuit 812 shown in FIG. 8 as the SR MOS B turn-off signal. Components of K5 1012 will be discussed in detail when FIG. 10*b* is presented.

Figure 10B:
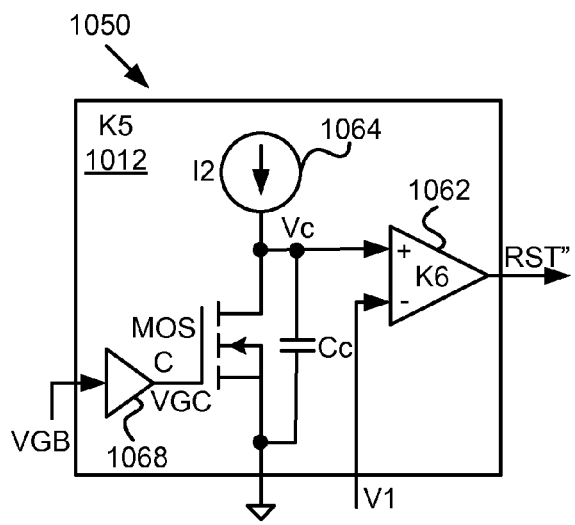
FIG. 10b is a schematic block diagram illustrating one embodiment of a voltage comparison sub-module included in the SR turn-off signal generator shown in FIG. 10a according to the present invention.

FIG. 10b is a schematic block diagram illustrating one embodiment of the voltage comparison sub-module K5 1012 included in the SR turn-off signal generator 2 820 shown in FIG. 10a according to the present invention. In the disclosed embodiment, the voltage comparison sub-module K5 1012 includes a logic inverter 1068, MOS C, a constant current source I2 1064, a capacitor Cc, and a third voltage comparator K6 1062. Like SR MOS B, MOS C is an n-channel MOSFET, but does not function as synchronous rectifier. MOS C is referred to as SR MOSFET conduction interval generating ("SCIG") MOSFET. Inverting the SR MOS B gate voltage VGB by use of the inverter 1068 results in the gate voltage VGC of MOS C.

When SR MOS B is turned on, MOS C is off. While MOS C is off, the capacitor Cc connected across the drain and source of MOS C is released and charged by the constant current source I2 1064 at the slew rate of I2/Cc. The resultant voltage Vc across the capacitor Cc is connected to the non-inverting input of the third voltage comparator K6 1062 and the voltage V1 (across the capacitor Cv1) is connected to the inverting input of K6 1062. When the voltage Vc exceeds the voltage V1, the output RST" of K6 1062 goes from low to high, operating as SR MOS B turn-off signal. The time interval between the SR MOS B turn on instant and the occurrence of the SR MOS B turn-off signal RST" is SR MOS B on time TBON. In other words, TBON begins when the capacitor Cc starts charging by current I2 and ends when the voltage across Cc reaches V1. As discussed previously, in general, the relationship between current and voltage in a capacitor C is: I=C×Δv/Δt, and Δt=C×Δv/I. In the present case, Δt=TBON, C=Cc, Δv=V1, and I=I2. Therefore, TBON=Cc×V1/I2, which can be adjusted by adjusting V1. Thus, making TBON adjustable is an alternative to adjusting IBT for optimizing the conduction time t of the body diode D2 of SR MOS B, so that it may eventually be made substantially equal to T1.

Figure 11:
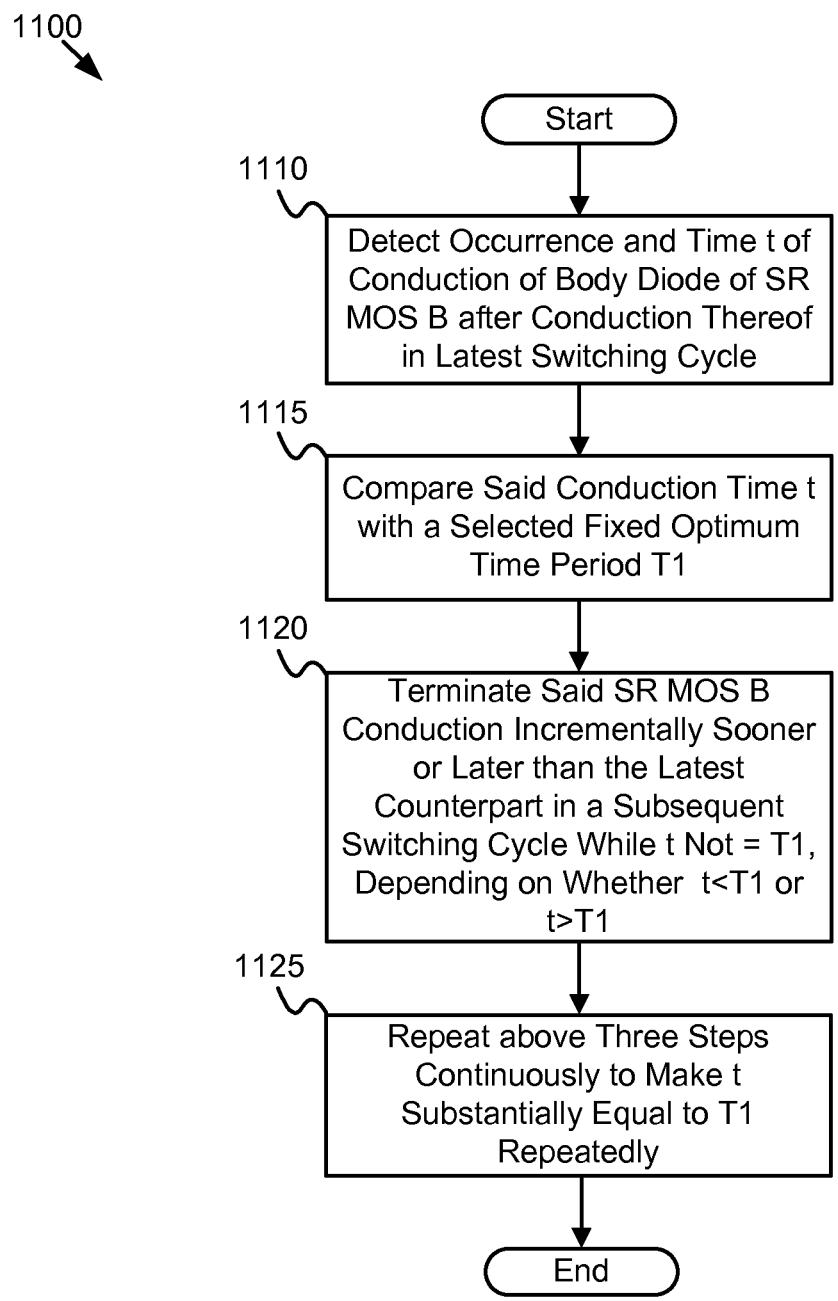
FIG. 11 is a schematic flow chart diagram illustrating one embodiment of a method for optimizing body diode conduction in a synchronous rectifier ("SR") MOSFET according to the present invention.

FIG. 11 is a schematic flow chart diagram illustrating one embodiment of a method 1100 for optimizing body diode conduction in a synchronous rectifier ("SR") MOSFET according to the present invention. With reference to FIGS. 6a and 6b, the method 1100 begins with detecting 1110 an occurrence and time duration t of conduction of the body diode D2 of SR MOS B following the end of conduction of SR MOS B in the latest switching cycle by means of the first voltage comparator K1 610 (FIG. 6a), resulting in formation of the first pulse S1. The pulse width pw_S1 represents the body diode D2's conduction time t. By using the single pulse generator K3 612 the second pulse S2 is generated by triggering on the rising edge of S1, with the former pulse width pw_S2 being made equal to the selected fixed optimum time period T1. The method 1100 proceeds to compare 1115 pw_S1 with pw_S2, that is, t vs. T1, to determine which duration is longer by means of the pulse width comparison module K4 614 (FIG. 6b). Then the method 1100 terminates 1120 conduction of SR MOS B in the next switching cycle incrementally sooner or later than the counterpart in the preceding (latest) switching cycle while t is unequal to T1, depending on whether t is shorter or longer than T1, by using the output RST of the second voltage comparator K2 622, which effectively compares a feedback loop voltage against VDS of SR MOS B in one embodiment. The method 1100 continuously repeats 1125 the above three steps to make t substantially equal to T1 repeatedly.

Utilizing mostly available integrated circuits (ICs) to optimize conduction time of a body diode of an SR MOSFET after its conduction, which contributes to the entire or partial dead time for a synchronous power converter, is a cost effective way to maximize power efficiency and enable both CCM and DCM operations. The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a first input voltage terminal and a second input voltage terminal connected to ground;
   an output module comprising a first output voltage terminal and a second output voltage terminal, and an output-filter capacitor to be connected across said two output voltage terminals;
   a main switch to be disposed between said two input voltage terminals;
   a synchronous rectifier ("SR") MOSFET included in a non-resonant DC-DC converter having a gate control terminal and a distal end to be connectable to the output module;
   a switch connector to connect the main switch with the SR MOSFET, said switch connector is selected from the group consisting of a) a transformer with a primary winding and a secondary winding and b) a pair of electrical leads;
   an SR turn-off signal generator to provide an SR turn-off signal to terminate conduction of the SR MOSFET at an appropriate time to make conduction time t of a body diode thereof in a subsequent switching cycle substantially equal to a selected fixed optimum period T1 in each switching cycle, said signal generator comprising:
      a body diode conduction detector to detect a latest said conduction time t of said body diode subsequent to an end of the SR MOSFET conduction; and
      a body diode conduction optimizer to compare durations between said conduction time t and T1, said body diode conduction optimizer to increase an SR turn-off threshold current ("IBT") in response to said conduction time t being shorter than T1 by outputting said SR turn-off signal sooner than the end point of said latest SR MOSFET conduction, and to decrease the IBT in response to said conduction time t being longer than T1 by outputting said SR turn-off signal later than the end point of said latest SR MOSFET conduction; and
   a self-synchronized control circuit having an output to be connected to said gate control terminal, said self-synchronized control circuit to turn the SR MOSFET on and off, wherein said SR MOSFET turning off occurs responsive to receiving said SR turn-off signal outputted by said body diode conduction optimizer.

2. The apparatus of claim 1, wherein if the switch connector is the transformer, the primary winding is to be connected between the first input voltage terminal and the main switch, and the secondary winding is to be connected between a proximal end of the SR MOSFET and the second output voltage terminal.

3. The apparatus of claim 1, wherein if the switch connector is the pair of electrical leads, the main switch and the SR MOSFET are to be connected in series at a switch node with the pair of electrical leads, and the second voltage output terminal is to be connected to ground.

4. The apparatus of claim 3, further comprising an inductor to be connected between said switch node and a terminal selected from the group consisting of the first output voltage terminal, the first input voltage terminal and ground.

5. The apparatus of claim 1, wherein said body diode conduction detector comprises a first voltage comparator with a non-inverting input and an inverting input to be connected to the source end and the drain end of the SR MOSFET, respectively, said first voltage comparator to have an output voltage rising from low to high responsive to the source voltage's exceeding the drain voltage, producing a first pulse with pulse width equal to said conduction time t.

6. The apparatus of claim 5, wherein said body diode conduction detector further comprises a single-pulse generator, responsive to triggering on the rising edge of the first pulse, said single-pulse generator to produce a second pulse with pulse width equal to T1, whereby the rising edges of the first pulse and the second pulse are synchronously aligned.

7. The apparatus of claim 6, wherein said body diode conduction optimizer comprises a pulse width comparison module having an output terminal, said pulse width comparison module to compare the pulse width of the first pulse with the pulse width of the second pulse to determine which of said two pulses terminates last and to provide a current for charging or a current for discharging a capacitor Cv1 to be connected between said module's output terminal and a ground with a voltage V1 thereacross.

8. The apparatus of claim 7, wherein the voltage V1 across the capacitor Cv1 is made incrementable or decrementable by such an amount as equal to a product of the amount of said charging current or the amount of said discharging current and a selected time segment divided by Cv1's capacitance, depending on whether said conduction time t is shorter or longer than T1.

9. The apparatus of claim 8, wherein said body diode conduction optimizer further comprises a feedback loop provided by a voltage V1-controlled current source I1 to be connected between said output terminal of said pulse width comparison module and a proximal end of a resistor R1.

10. The apparatus of claim 9, wherein said body diode conduction optimizer further comprises a second voltage comparator having an output to be connected to said self-synchronizing control circuit, said second voltage comparator to connect a non-inverting input thereof to a distal end of the resistor R1, thereby routing current I1 therethrough to produce a voltage drop, to connect an inverting input thereof essentially to said drain-to-source voltage of SR MOSFET, and to output a voltage rising from low to high when the former input voltage exceeds the latter input voltage, resulting in outputting said SR turn-off signal, whereby said SR turn-off signal is transmitted to said self synchronizing control circuit to terminate the conduction of SR MOSFET.

11. The apparatus of claim 8, wherein said body diode conduction optimizer further comprise a current source supplying a constant current I2, an SR MOSFET conduction interval generating ("SCIG") MOSFET, a capacitor Cc, and a logic inverter, said current source I2 to be connected to a drain of said SCIG MOSFET, said SCIG MOSFET having a source connected to ground and a gate control terminal to be connected to an output of said logic inverter, said capacitor Cc to be connected between the drain and the source of said SCIG MOSFET, and said logic inverter to have an input connected to the gate control terminal of the SR MOSFET.

12. The apparatus of claim 11, wherein said body diode conduction optimizer further comprises a third voltage comparator with an output connected to said self-synchronized control circuit, said third voltage comparator to have a voltage across said capacitor Cc connected to a non-inverting input and the voltage V1 across the capacitor Cv1 connected to an inverting input and to have an output voltage rising from low to high when the former voltage exceeds the latter voltage, resulting in outputting said SR turnoff signal, whereby a conduction interval of the SR MOSFET is generated, which is equal to a product of Cc's capacitance and V1 divided by I2.

13. A system comprising:
an alternating current ("AC") power source;
an input rectifier to convert said AC to direct current ("DC");
an input filter to smooth an output of said input rectifier;
a power factor correction ("PFC") controller connected to the input filter to shape the output current of the input filter and produce a DC output with a maximum power factor, the PFC controller to have two output terminals; and
a non-resonant synchronous rectification DC-DC converter comprising:
a first input voltage terminal and a second input voltage terminal connected to ground, said two input terminals to be externally connected to the two output terminals of the PFC controller;
an output module comprising a first output voltage terminal and a second output voltage terminal, and an output-filter capacitor to be connected across said two output voltage terminals;
a main switch to be disposed between said two input voltage terminals;
a synchronous rectifier ("SR") MOSFET having a gate control terminal and a distal end to be connectable to the output module;
a switch connector to connect the main switch with the SR MOSFET, said switch connector is selected from the group consisting of a) a transformer with a primary winding and a secondary winding and b) a pair of electrical leads;
an SR turn-off signal generator to provide an SR turn-off signal to terminate conduction of the SR MOSFET at an appropriate time to make conduction time t of a body diode thereof in a subsequent switching cycle substantially equal to a selected fixed optimum period T1 in each switching cycle, said signal generator comprising:
a body diode conduction detector to detect a latest said conduction time t of said body diode subsequent to an end of the SR MOSFET conduction; and
a body diode conduction optimizer to compare durations between said conduction time t and T1, said body diode conduction optimizer to increase an SR turn-off threshold current ("IBT") in response to said conduction time t being shorter than T1 by outputting said SR turn-off signal sooner than the end point of said latest SR MOSFET conduction, and to decrease the IBT in response to said conduction time t being longer than T1 by outputting said SR turn-off signal later than the end point of said latest SR MOSFET conduction; and
a self-synchronized control circuit having an output to be connected to said gate control terminal, said self-synchronized control circuit to turn the SR MOSFET on and off, wherein said SR MOSFET turning off occurs responsive to receiving said SR turn-off signal outputted by said body diode conduction optimizer.

14. The system of claim 13, wherein if the switch connector is the transformer, the primary winding is to be connected between the first input voltage terminal and the main switch, and the secondary winding is to be connected between a proximal end of the SR MOSFET and the second output voltage terminal.

15. The system of claim 13, wherein if the switch connector is the pair of electrical leads, the main switch and the SR MOSFET are to be connected in series at a switch node with the pair of electrical leads, and the second voltage output terminal is to be connected to ground.

16. The system of claim 15, further comprising an inductor to be connected between said switch node and a terminal selected from the group consisting of the first output voltage terminal, the first input voltage terminal and ground.

17. The system of claim 13, wherein said body diode conduction detector comprises a first voltage comparator with a non-inverting input and an inverting input to be connected to the source end and the drain end of the SR MOSFET, respectively, said first voltage comparator to have an output voltage rising from low to high responsive to the source voltage's exceeding the drain voltage, producing a first pulse with pulse width equal to said conduction time t.

18. The system of claim 17, wherein said body diode conduction detector further comprises a single-pulse generator, responsive to triggering on the rising edge of the first pulse, said single-pulse generator to produce a second pulse with pulse width equal to T1, whereby the rising edges of the first pulse and the second pulse are synchronously aligned.

19. The system of claim 18, wherein said body diode conduction optimizer comprises a pulse width comparison module having an output terminal, said pulse width comparison module to compare the pulse width of the first pulse with the pulse width of the second pulse to determine which of said two pulses terminates last and to provide a current for charging or a current for discharging a capacitor Cv1 to be connected between said module's output terminal and a ground with a voltage V1 thereacross.

20. The system of claim 19, wherein the voltage V1 across the capacitor Cv1 is made incrementable or decrementable by such an amount as equal to a product of the amount of said charging current or the amount of said discharging current and a selected time segment divided by Cv1's capacitance, depending on whether said conduction time t is shorter or longer than T1.

21. The system of claim 20, wherein said body diode conduction optimizer further comprises a feedback loop provided by a voltage V1-controlled current source I1 to be connected between said output terminal of said pulse width comparison module and a proximal end of a resistor R1.

22. The system of claim 21, wherein said body diode conduction optimizer further comprises a second voltage comparator having an output to be connected to said self-synchronizing control circuit, said second voltage comparator to connect a non-inverting input thereof to a distal end of the resistor R1, thereby routing current I1 therethrough to produce a voltage drop, to connect an inverting input thereof essentially to said drain-to-source voltage of SR MOSFET, and to output a voltage rising from low to high when the former input voltage exceeds the latter input voltage, resulting in outputting said SR turn-off signal, whereby said SR turn-off signal is transmitted to said self synchronizing control circuit to terminate the conduction of SR MOSFET.

23. A method for optimizing body diode conduction in a synchronous rectifier ("SR") MOSFET included in a non-resonant DC-DC converter comprising:
a) detecting conduction time t of a body diode of the SR MOSFET subsequent to an end of conduction thereof in a latest switching cycle;
b) comparing said conduction time t with a selected fixed optimum time period T1;
c) increasing an SR turn-off threshold current ("IBT") in response to said conduction time t being shorter than T1 by terminating said SR MOSFET conduction sooner than the end point of said latest SR MOSFET conduction, and decreasing the IBT in response to said conduction time t being longer than T1 by terminating said SR MOSFET conduction later than the end point of said latest SR MOSFET conduction; and
d) continuously repeating steps a-c to make said conduction time t substantially equal to T1 in length repeatedly.

* * * * *